(12) United States Patent
Itoh et al.

(10) Patent No.: US 12,377,636 B2
(45) Date of Patent: Aug. 5, 2025

(54) RESIN FILM FOR LAMINATING METAL PLATE AND LAMINATED METAL PLATE USING THE SAME

(71) Applicant: TOYO KOHAN CO., LTD., Tokyo (JP)

(72) Inventors: Yoshimi Itoh, Kudamatsu (JP); Masashi Ikebuchi, Kudamatsu (JP); Kenjirou Tanaka, Kudamatsu (JP)

(73) Assignee: TOYO KOHAN CO., LTD., Tokyo (JP)

( * ) Notice: Subject to any disclaimer, the term of this patent is extended or adjusted under 35 U.S.C. 154(b) by 573 days.

(21) Appl. No.: 17/610,590

(22) PCT Filed: May 20, 2019

(86) PCT No.: PCT/JP2019/019974
§ 371 (c)(1),
(2) Date: Nov. 11, 2021

(87) PCT Pub. No.: WO2020/234979
PCT Pub. Date: Nov. 26, 2020

(65) Prior Publication Data
US 2022/0212444 A1    Jul. 7, 2022

(51) Int. Cl.
*B32B 15/09* (2006.01)
*B32B 1/00* (2024.01)
(Continued)

(52) U.S. Cl.
CPC ............... *B32B 15/09* (2013.01); *B32B 1/00* (2013.01); *B32B 27/18* (2013.01); *B32B 27/32* (2013.01);
(Continued)

(58) Field of Classification Search
None
See application file for complete search history.

(56) References Cited

U.S. PATENT DOCUMENTS 5,846,642 A       12/1998   Kimura et al.
12,049,060 B2 *    7/2024   Kawamura ............. B32B 27/36
(Continued)

FOREIGN PATENT DOCUMENTS

EP    0 905 191 A1    3/1999
JP    52-42545 A      4/1977
(Continued)

OTHER PUBLICATIONS

JP 05-214228 A (Nasu et al.) (published Aug. 24, 1993) (machine translation) (Year: 1993).*
(Continued)

*Primary Examiner* — Vivian Chen
(74) *Attorney, Agent, or Firm* — Sughrue Mion, PLLC

(57) ABSTRACT

A resin film for laminating a metal plate including a resin composition including a polyester-based thermoplastic elastomer and a thermoplastic polyester having a glass transition temperature (Tg) of 70° C. or more and 90° C. or less. The thermoplastic elastomer is dispersed in the thermoplastic polyester. A content of the thermoplastic elastomer in the film is 2 to 50 wt %, and an absolute value $\Delta Tg$ of a difference between a glass transition temperature of the thermoplastic polyester and a glass transition temperature of the film satisfies the following Expression (1):

$$\Delta Tg < 0.5 \times W \quad (1)$$

wherein W represents the thermoplastic elastomer content (wt %) in the film.

10 Claims, 1 Drawing Sheet

(51) Int. Cl.
  *B32B 15/18*   (2006.01)
  *B32B 27/08*   (2006.01)
  *B32B 27/18*   (2006.01)
  *B32B 27/28*   (2006.01)
  *B32B 27/32*   (2006.01)
  *B32B 27/36*   (2006.01)
  *B65D 25/14*   (2006.01)
  *C08L 67/02*   (2006.01)
  *C08L 67/03*   (2006.01)

(52) U.S. Cl.
  CPC .............. *B32B 27/36* (2013.01); *B65D 25/14* (2013.01); *C08L 67/02* (2013.01); *B32B 15/18* (2013.01); *B32B 27/08* (2013.01); *B32B 27/285* (2013.01); *B32B 2250/02* (2013.01); *B32B 2270/00* (2013.01); *B32B 2274/00* (2013.01); *B32B 2307/54* (2013.01); *B32B 2307/558* (2013.01); *B32B 2307/732* (2013.01); *B32B 2307/746* (2013.01); *B32B 2435/02* (2013.01); *B32B 2439/00* (2013.01); *B32B 2439/66* (2013.01); *B32B 2439/70* (2013.01); *B32B 2439/80* (2013.01); *C08L 67/025* (2013.01); *C08L 67/03* (2013.01); *C08L 2203/16* (2013.01); *C08L 2205/025* (2013.01); *C08L 2207/04* (2013.01); *Y10T 428/31681* (2015.04); *Y10T 428/31786* (2015.04)

(56) References Cited

U.S. PATENT DOCUMENTS

| | | |
|---|---|---|
| 2003/0118811 A1 | 6/2003 | Sato et al. |
| 2005/0100723 A1 | 5/2005 | Tanaka et al. |
| 2005/0100749 A1 | 5/2005 | Hu et al. |
| 2005/0191483 A1 | 9/2005 | Yoshida et al. |
| 2006/0083908 A1 | 4/2006 | Yoshida et al. |
| 2020/0346491 A1 | 11/2020 | Anzai et al. |

FOREIGN PATENT DOCUMENTS

| | | |
|---|---|---|
| JP | 61-52179 B2 | 11/1986 |
| JP | 5-214228 A | 8/1993 |
| JP | 06-256630 A | 9/1994 |
| JP | 7-290644 A | 11/1995 |
| JP | 8-66988 A | 3/1996 |
| JP | 8-67808 A | 3/1996 |
| JP | 9-279101 A | 10/1997 |
| JP | 10-77397 A | 3/1998 |
| JP | 11-115136 A | 4/1999 |
| JP | 2001-253032 A | 9/2001 |
| JP | 2001-301091 A | 10/2001 |
| JP | 2001-353814 A | 12/2001 |
| JP | 2002-347176 A | 12/2002 |
| JP | 2003-226762 A | 8/2003 |
| JP | 2004-149790 A | 5/2004 |
| JP | 2005-111923 A | 4/2005 |
| JP | 2005-194473 A | 7/2005 |
| JP | 2006-199014 A | 8/2006 |
| JP | 2006-297758 A | 11/2006 |
| JP | 2007-56274 A | 3/2007 |
| JP | 2008-254348 A | 10/2008 |
| JP | 2014-74156 A | 4/2014 |
| WO | 97/45483 A1 | 12/1997 |
| WO | 03/074611 A1 | 9/2003 |
| WO | 2019/082767 A1 | 5/2019 |

OTHER PUBLICATIONS

Communication dated Mar. 14, 2023 issued by the Japanese Office Action in corresponding Japanese patent application No. 2021-519922.
Extended European Search Report dated Nov. 28, 2022 in corresponding European Application No. 19929910.8.
International Search Report dated Jul. 30, 2019 in International Application No. PCT/JP2019/019974.

* cited by examiner

RESIN FILM FOR LAMINATING METAL PLATE AND LAMINATED METAL PLATE USING THE SAME

CROSS REFERENCE TO RELATED APPLICATIONS

This application is a National Stage of International Application No. PCT/JP2019/019974, filed May 20, 2019.

TECHNICAL FIELD

The present invention relates to a resin film for laminating a metal plate and a laminated metal plate using the same.

BACKGROUND ART

Laminated cans having no side seam (seamless cans) that are formed by subjecting a laminated metal plate prepared in advance by laminating a resin film with a metal plate such as an aluminum plate, a tinned plate and a tin-free steel plate to drawing, flexural elongation (stretching) and/or ironing have been widely used.

In recent years, along with expanded use of the laminated seamless cans, processing methods have been diversified, so that resin films have been required to have higher workability than before.

For example, in the case where a thick-gauge steel plate is processed at a high drawing ratio to make a can body side wall at a high plate thickness reduction rate, the steel plate is subjected to strong compression processing in the circumferential direction of the can while receiving heat generated in the processing. Furthermore, as a trend in recent years, secondary processing performed after forming of a can body such as bead processing, circumferential polyhedral wall processing, and embossing is preferred for the purpose of improving design and paneling strength. However, in the secondary processing, local processing is applied to a limited area of the can body after once subjected to processing and heat exposure. In order to deal with such processing, a material satisfying further strength, flexibility, and adhesion in addition to the conventional performance requirements has been required.

As the resin used for a laminated seamless can, a thermoplastic polyester having a small environmental load, excellent can-making workability, and excellent content protection performance such as flavor properties is suitable and widely used. A thermoplastic polyester, however, has inferior impact resistance after molding, so that a crack caused by impact after molding may result in corrosion of metal due to corrosiveness of the content in the can. Accordingly, a metal may be eluted into the contents, or may cause discoloration to impair the appearance.

As a measure for improving the impact resistance of a thermoplastic polyester film, a method of interposing a primer for adhesion between a polyester film and a metal plate has been disclosed (for example, Patent Document 1).

Also, a film having an improved impact resistance prepared by melt-kneading a flexible resin into a thermoplastic polyester resin to be dispersed in a particle state such that the flexible resin absorbs the impact has been disclosed (for example, Patent Documents 1 to 13).

Disclosed examples of the film with a polyolefin melt-kneaded as the flexible resin include a film with a polyolefin having no polar group such as an ethylene-propylene copolymer melt-kneaded (Patent Document 1), a film with a polyolefin including an ionomer or a compound having a polar group such as a carboxyl group introduced by copolymerization melt-kneaded (Patent Documents 2 and 3), a film with a polyolefin including an ionomer or a compound having a polar group such as a carboxyl group introduced by copolymerization, added as compatibilizer during melt-kneading of a polyolefin having no polar group and a thermoplastic polyester (Patent Documents 4 and 5), and the like.

Further, a film with a polyester-based thermoplastic elastomer as a flexible resin melt-kneaded into a thermoplastic polyester is also known (Patent documents 7 to 13).

RELATED ART

Patent Documents

Patent Document 1: Japanese Patent Laid-Open No. 2002-347176
Patent Document 2: Japanese Patent Laid-Open No. 2001-353814
Patent Document 3: Japanese Patent Laid-Open No. 2003-226762
Patent Document 4: Japanese Patent Laid-Open No. 2005-194473
Patent Document 5: Japanese Patent Laid-Open No. 2004-149790
Patent Document 6: Japanese Patent Publication No. 61-52179
Patent Document 7: Japanese Patent Laid-Open No. 7-290644
Patent Document 8: Japanese Patent Laid-Open No. 8-66988
Patent Document 9: Japanese Patent Laid-Open No. 8-67808
Patent Document 10: International Publication No. WO 97/45483
Patent Document 11: Japanese Patent Laid-Open No. 10-77397
Patent Document 12: Japanese Patent Laid-Open No. 2001-253032
Patent Document 13: Japanese Patent Laid-Open No. 2001-301091

SUMMARY OF THE INVENTION

Problem to be Solved by the Invention

As described above, as a measure for improving the impact resistance of a thermoplastic polyester film, a method of interposing a primer for adhesion between a polyester film and a metal plate has been disclosed (for example, Patent Document 1). The method, however, requires a step of applying a primer for adhesion, which causes cost increase.

Examples of the film having an improved impact resistance prepared by melt-kneading a polyolefin as flexible resin into a thermoplastic polyester to be dispersed in a particle state such that the flexible resin absorbs the impact include a film with a melt-kneaded polyolefin having no polar group such as an ethylene-propylene copolymer (Patent Document 1). These polyolefins have low compatibility and miscibility with a thermoplastic polyester, so that the polyolefin particle in the thermoplastic polyester has a large size and the adhesion at the interface between the polyolefin particle and the thermoplastic polyester is low. As a result, in processing of a metal plate laminated with the film into a laminated can having no side seam (seamless can), processing that applies a large shear to the film such as drawing, flexural elongation (stretching) and ironing tends to cause scraping of the film due to interfacial peeling between the polyolefin and the thermoplastic polyester.

Accordingly, in order to improve the compatibility and miscibility of the polyolefin and the thermoplastic polyester, a film with a melt-kneaded polyolefin including an ionomer or a compound having a polar group such as a carboxyl group introduced by copolymerization (Patent Documents 2 and 3), and a film with a polyolefin including an ionomer or a compound having a polar group such as a carboxyl group introduced by copolymerization, added as compatibilizer during melt-kneading of a polyolefin having no polar group and a thermoplastic polyester (Patent Documents 4 and 5) are disclosed.

In these films, the polyolefin particles fine down in the thermoplastic polyester and the interfacial adhesion is also improved. However, it is known that a polyolefin with such as an ionomer or a compound having a polar group a carboxyl group introduced by copolymerization is easily gelled through a reaction with a thermoplastic polyester (Patent Document 6). When these olefins and a thermoplastic polyester are melt-kneaded in an extruder, a gel is easily generated. In particular, in the case where a filter is applied to remove foreign substances in the film, a gel is generated in the filter, so that the filter is easily clogged, and productivity is significantly reduced.

Further, a film with a polyester-based thermoplastic elastomer as a flexible resin melt-kneaded into a thermoplastic polyester is also known (Patent Documents 7 to 13). Since a polyester-based thermoplastic elastomer is highly compatible with a thermoplastic polyester, the size of the polyester-based thermoplastic elastomer particles in the thermoplastic polyester decreases and the adhesion of the interface between these increases. As a result, scraping of the film is hardly caused even in processing with a large shear applied to the film.

A polyester-based thermoplastic elastomer, however, is easily miscible with a thermoplastic polyester. When miscibilized, the polyester-based thermoplastic elastomer is not dispersed in a particle state in the thermoplastic polyester, resulting in lowered impact absorption. Further, due to decrease in the glass transition temperature of the film composed of the polyester-based thermoplastic elastomer and the thermoplastic polyester, the film is incapable of withstanding the heat generated during processing after lamination of the film with a metal plate, so that film fracture is easily caused.

Furthermore, a film with a polyester-based thermoplastic elastomer melt-kneaded into a thermoplastic polyester has low slidability, so that adherence between films tends to occur during winding of the film. Although a lubricant made of inorganic particles is added to prevent the adherence, use of an expensive lubricant having a small particle size with a narrow particle size distribution is required in order to withstand the rigorous processing into a laminated can having no side seam (seamless can). Further, depending on the lubricant, the impact resistance of the film may be lowered due to addition of the lubricant.

Means for Solving the Problem

As a film of a thermoplastic polyester having excellent impact resistance, with rare occurrence of gel and less scraping of the film during processing, the present inventors have focused on a film with a polyester-based thermoplastic elastomer melt-kneaded, and have diligently studied a film having improved impact resistance, capable of withstanding the heat generated in processing during molding. Furthermore, the present inventors have also examined a film having improved slidability described above at low cost while maintaining impact resistance, and have found that a film having improved impact resistance, capable of withstanding the heat generated in processing during molding can be made by melt-kneading a specific polyester-based thermoplastic elastomer with a specific thermoplastic polyester. Furthermore, the present inventors have found that the slidability of the film is improved while maintaining the impact resistance by mixing a polyolefin having a specific elastic modulus, so that the present invention has been completed.

In other words, according to the present invention, provided is a resin film for laminating a metal plate comprising a resin composition including a polyester-based thermoplastic elastomer and a thermoplastic polyester having a glass transition temperature (Tg) of 70° C. or more and 90° C. or less where the thermoplastic elastomer is dispersed in the thermoplastic polyester, wherein a content of the thermoplastic elastomer in the film is 2 to 50 wt %, and an absolute value $\Delta Tg$ of a difference between a glass transition temperature of the thermoplastic polyester and a glass transition temperature of the film satisfies $\Delta Tg < 0.5 \times W$, wherein W represents a thermoplastic elastomer content (wt %) in the film. Further, containing 1 to 10 wt % of a polyolefin having an elastic modulus of 300 MPa or less is preferred to improve the slidability of the film while maintaining the impact resistance.

Further, according to the present invention, a laminated metal plate with the above resin film laminated on at least one surface of the metal plate is provided.

Furthermore, according to the present invention, a container and a lid made of the laminated metal plate processed to be on the inner surface side is provided.

Effects of Invention

According to the present invention, a film made of a thermoplastic polyester excellent in content protection performance such as flavor properties, having excellent impact resistance and less reduction in productivity with rare occurrence of gel, and when laminated with a metal plate to make a laminated metal plate, being capable of suppressing scraping of the film during processing for can making, and having heat resistance for withstanding heat generated during processing; and a laminated metal plate using the same can be provided.

DESCRIPTION OF EMBODIMENTS

<Resin Film for Laminating Metal Plate>

A resin film for laminating a metal plate in the present embodiment is made of a resin composition including a polyester-based thermoplastic elastomer and a thermoplastic polyester having a glass transition temperature (Tg) of 70° C. or more and 90° C. or less where the thermoplastic elastomer is dispersed in the thermoplastic polyester, a content of the polyester-based thermoplastic elastomer in the resin film for laminating a metal plate is in the range of 2 to 50 wt %.

The thermoplastic polyester may be a thermoplastic polyester having a glass transition temperature (Tg) of 70° C. or more and 90° C. or less and capable of being molded into a film, and is not particularly limited. Examples thereof include polyethylene terephthalate (PET), polyethylene isophthalate, and polyesters including those copolymerized with a dicarboxylic acid component including an aromatic dicarboxylic acid such as isophthalic acid, terephthalic acid, 2,6-naphthalenedicarboxylic acid, diphenyldicarboxylic acid, diphenylsulfonedicarboxylic acid, diphenoxyethanedicarboxylic acid, diphenyl ether dicarboxylic acid, 5-sulfoisophthalic acid, and phthalic acid, an aliphatic dicarboxylic acid component such as oxalic acid, succinic acid, adipic acid, sebacic acid, dimer acid, maleic acid and fumaric acid, and an alicyclic dicarboxylic acid such as cyclohexanedicarboxylic acid; an aliphatic glycol such as ethylene glycol, triethylene glycol, polyethylene glycol, polytetramethylene glycol, propanediol, butanediol, pentanediol, hexanediol, and neopentyl glycol; an aromatic glycol such as bisphenol A and bisphenol S, or an alicyclic glycol such as cyclohexanedimethanol. Further, as the thermoplastic polyester, the polyesters described above may be used singly or in combination of two or more.

The glass transition temperature (Tg) of the thermoplastic polyester needs to be 70° C. or more and 90° C. or less. The glass transition temperature (Tg) of the thermoplastic polyester is preferably 72 to 85° C., more preferably 74 to 80° C. With a Tg of less than 70° C., the heat resistance of the resulting resin film for laminating a metal plate decreases, so that compatibility between the impact resistance and the heat resistance for withstanding the heat generated during processing cannot be achieved. On the other hand, with a Tg of more than 90° C., the impact resistance of the resulting film decreases.

Among the thermoplastic polyesters, a thermoplastic polyester including ethylene terephthalate and/or ethylene isophthalate as main component is preferred from the viewpoints of cost and flavor. In this case, the main component refers to ethylene terephthalate and/or ethylene isophthalate having 50 mol % or more of units derived from the terephthalic acid component and the isophthalic acid component as dicarboxylic acid component in the units derived from the total dicarboxylic acid components.

Further, the thermoplastic polyester for use in the present embodiment may be copolymerized with a polyfunctional component selected from trifunctional or higher functional polybasic acids and polyhydric alcohols. The copolymerization with a polyfunctional component is preferred because draw resonance (edge shaking), which is shaking of the end portion (edge) of a film to cause variation in film thickness during high-speed production of the film or during production of a laminated metal plate through lamination of a melted film directly onto a metal plate at high speed, can be reduced. Examples of the polyfunctional component selected from trifunctional or higher functional polybasic acids and polyhydric alcohols include trimellitic acid, trimellitic anhydride, pyromellitic acid, pyromellitic anhydride, trimethylolpropane, pentaerythritol, and the like. The content of the polyfunctional component is 0.05 to 3.0 mol %, preferably 0.1 to 2.0 mol %, and particularly preferably 0.2 to 1.0 mol % in the thermoplastic polyester. With a content of the polyfunctional component in the above range, the draw resonance reducing effect can be appropriately enhanced while suppressing the occurrence of gelation in the thermoplastic polyester.

The thermoplastic polyester for use in the present embodiment dissolved in a mixed solvent of phenol/1,1,2,2-tetrachloroethane=1/1 has a limiting viscosity [η] measured at 30° C. of preferably 0.5 to 1.4 dl/g, more preferably 0.7 to 1.2 dl/g, and still more preferably 0.8 to 1.0 dl/g. With a limiting viscosity [η] set within the above range, the impact resistance of the resulting film can be improved, and the moldability into the film can be further improved.

Subsequently, the polyester-based thermoplastic elastomer for use in the present embodiment is described. The polyester-based thermoplastic elastomer is a resin composed of a polyester in which a dicarboxylic acid and a diol are linked through an ester bond. When heat is applied, the resin is softened to exhibit fluidity, and when cooled to room temperature (25° C.), the resin returns to a rubbery state. Specifically, the polyester-based thermoplastic elastomer for use in the present embodiment has a glass transition temperature (Tg) of preferably room temperature (25° C.) or less, more preferably less than 20° C., and still more preferably 10° C. or less, from the viewpoint of having rubber elasticity at room temperature (25° C.). The lower limit of the glass transition temperature (Tg) of the polyester-based thermoplastic elastomer for use in the present embodiment is preferably −50° C. or more, though not particularly limited. The structure of the polyester-based thermoplastic elastomer includes a hard segment having a hard crystal structure and a soft segment. When heat is applied, the hard segment melts to exhibit fluidity, and when cooled, the crystallized hard segment serves as entanglement point of molecular chains, so that rubbery properties are exhibited. Examples of the component constituting the hard segment include terephthalic acid, isophthalic acid, bisphenol A, bisphenol S, 2,6-naphthalenedicarboxylic acid, ethylene glycol, and 1,4-butanediol, and the like, and examples of the components constituting the soft segment include an aliphatic dicarboxylic acid such as adipic acid, sebacic acid and dimer acid, an aliphatic diol such as 1,6-hexanediol, 1,8-octanediol and 1,10-decanediol, a polyether such as polyethylene glycol, polytetramethylene glycol, and the like. Among these, a polyether is preferred, and among polyethers, polytetramethylene glycol is particularly preferred.

The structure of the polyester-based thermoplastic elastomer is not particularly limited as long as it exhibits rubbery properties at room temperature (25° C.). Examples of the index showing rubbery properties at room temperature (25° C.) include a glass transition temperature of the polyester-based thermoplastic elastomer of room temperature (25° C.) or less, preferably 20° C. or less. Examples of the preferred polyester-based thermoplastic elastomer include a polyether ester in which a soft segment made of a polyether unit and a hard segment made of a dicarboxylic acid are bonded through an ester bond, containing preferably 50 wt % or more of the polyether unit in the polyester-based thermoplastic elastomer. The content ratio of the polyether unit in the polyester-based thermoplastic elastomer is more preferably 50 to 70 wt %, still more preferably 52 to 65 wt %. At least one polyether unit may be contained in the polyester-based thermoplastic elastomer, or a plurality of polyether units may be contained. In the case where the polyester-based thermoplastic elastomer is other than a polyether ester or a polyether ester having a polyether unit content of less than 50 mass %, the elastomer tends to be miscible with the thermoplastic polyester when melt-kneaded, so that the heat resistance of the film decreases. In particular, in the case of polyether ester with a polyether unit content of 20 wt % or less, significant miscibilizaton occurs, so that not only the heat resistance of the film but also the impact resistance decreases. Examples of the particularly preferred polyester-based thermoplastic elastomer include a resin mainly composed of polybutylene terephthalate and polyoxyalkylene glycol, and a resin obtained by copolymerizing polybutylene terephthalate with polytetramethylene glycol (PTMG) is commercially available.

The molecular weight of the polyether unit (polyether segment) in the polyester-based thermoplastic elastomer is not particularly limited, and a polyether unit having a molecular weight of 500 to 5000 is preferably used. Further, the polyester-based thermoplastic elastomer may be modified with maleic anhydride or the like in order to improve the adhesion to a metal.

The content of the polyester-based thermoplastic elastomer in the resin film for laminating a metal plate of the present invention is 2 to 50 wt %, preferably 2.5 to 25 wt %, and more preferably 4 to 18 wt %. With a content of less than 2 wt %, the impact resistance of the film decreases. On the other hand, with a content of more than 50 wt %, the melt viscosity during melt-kneading of the polyester-based thermoplastic elastomer with the thermoplastic polyester decreases, so that a film may not be molded. In addition, even in the case where molding into a film is achieved, the heat resistance decreases, so that the film cannot withstand the heat generated in processing of a laminated metal plate including the film laminated to a metal plate.

When the thermoplastic elastomer content (wt %) in the resin film for laminating a metal plate of the present invention is represented by W, the absolute value $\Delta Tg$ of the difference between the glass transition temperature of the thermoplastic polyester and the glass transition temperature of the film satisfies: $\Delta Tg < 0.5 \times W$. With a $\Delta Tg$ of $0.5 \times W$ or more, increase in the polyester-based thermoplastic elastomer content for improving the impact resistance causes decrease in Tg of the film, resulting in decrease in the heat resistance. Accordingly, compatibility between the impact resistance and the heat resistance of the film cannot be achieved. A range satisfying $\Delta Tg < 0.2 \times W$ is particularly preferred.

Further, in the resin film for laminating a metal plate of the present invention, it is preferable that the polyester-based thermoplastic elastomer is dispersed in an island state in the thermoplastic polyester, and the size thereof has an average major axis of preferably 0.1 to 5.0 µm, more preferably 0.7 to 3.2 µm, and an average minor axis of preferably 0.01 to 2 µm, more preferably 0.15 to 1 µm.

The resin film for laminating a metal plate of the present invention may contain 1 to 10 wt % of a polyolefin having an elastic modulus of 300 MPa or less. In this case, the slidability of the film can be improved at low cost without decrease in the impact resistance of the film, so that adhesion during winding of the film can be prevented. With an elastic modulus of the polyolefin of more than 300 MPa, the impact resistance of the film decreases. The preferred elastic modulus of the polyolefin is 100 MPa or less. Further, with a content of a polyolefin of less than 1 wt %, the slidability of the film is not improved, while with a content of more than 10 wt %, the film is easily scraped during processing of a laminated metal plate composed of the film laminated to a metal plate. The content of a polyolefin having an elastic modulus of 300 MPa or less is preferably 2 to 8 wt %, more preferably 3 to 7 wt %.

Further, the resin film for laminating a metal plate of the present invention may be laminated with a layer of a resin other than the above to form laminated film. Such a layer may be provided as either the upper layer or the lower layer of the resin film for laminating a metal plate of the present invention, or may be provided as both the upper layer and the lower layer. As the resin for forming the layer, a resin may be selected according to the role of the layer. For example, a layer of polyethylene terephthalate copolymerized with isophthalic acid having a low melting point or a layer of an adhesive polyolefin provided on the surface of the resin film for laminating a metal plate to be laminated to the metal plate can improve the adhesiveness to the metal plate. Alternatively, a polyethylene terephthalate layer provided on a side opposite to a side to be laminated to a metal plate can improve the flavor properties of the film, and a polyethylene naphthalate layer provided thereon can improve the barrier properties of the film. The thickness of this resin layer needs to be within the range not impairing the impact resistance of the resin film for laminating a metal plate of the present invention. For example, in the case where a layer (lower layer) of a thermoplastic polyester, a polyester-based thermoplastic elastomer, and a polyolefin on an as needed basis, which are melt-kneaded, is provided on the side to be laminated to a metal plate, and a layer (upper layer) of polyethylene terephthalate or polyethylene terephthalate/polyethylene isophthalate copolymer (PET/I) having excellent flavor properties is provided on the opposite side so as to make a two-layer film, the thickness ratio between the lower layer and the upper layer is set to preferably in the range of lower layer:upper layer=1:4 to 24:1, more preferably in the range of 1:1 to 19:1, still more preferably 4:1 to 9:1. With such a thickness ratio, the flavor properties can be suitably enhanced while maintaining good impact resistance of the film.

Further, to the resin film for laminating a metal plate of the present invention, an additive such as a light stabilizer, an impact resistance improver, a compatibilizer, a lubricant, a plasticizer, an antistatic agent, a reaction catalyst, a coloring preventing agent, a radical prohibitor, a plasticizer, an antistatic agents, a terminal blocking agent, an antioxidant, a heat stabilizer, a mold release agent, a flame retardant, an antibacterial agent, and antifungal agent may be added. In particular, an antioxidant is also effective for preventing rust on the surface of the metal plate to be laminated to the film, and vitamin E is preferably used from the viewpoint of food hygiene. The content of these additives is preferably 0.005 to 5 wt %, more preferably 0.01 to 2 wt %, and still more preferably 0.05 to 1 wt %. With a content set to within the range, the effect of addition can be sufficient, while maintaining good film strength.

The method for producing the resin film for laminating a metal plate of the present invention is not particularly limited, and examples thereof include a method including melt-kneading a thermoplastic polyester, a polyester-based thermoplastic elastomer, and a polyolefin for use on an as needed basis supplied to an extruder, then extruding from a T-die into a film state, and cooling and solidifying the film into a roll state. Although the temperature for melt-kneading may be within the range in which the thermoplastic polyester can be melt-kneaded, the temperature should be as low as possible because of the low thermal stability of the polyester-based thermoplastic elastomer. Further, when the thermoplastic polyester and the polyester-based thermoplastic elastomer are kneaded in a molten state for a long time, a transesterification reaction proceeds between these resins so as to cause miscibilization easily. Therefore, it is preferable to perform the kneading in a short time. Accordingly, a method (side feeding) including melting the thermoplastic polyester only, and then feeding the polyester-based thermoplastic elastomer from the middle of the extruder with decrease in temperature for kneading is preferably used.

In the case where a laminated film is made by laminating another resin layer in addition to the resin layer including a thermoplastic polyester, a polyester-based thermoplastic elastomer, and a polyolefin used on an as needed basis, the resin is supplied to another extruder, subjected to merging by using a feed block or a multi-manifold T-die, and co-extruded to produce the laminated film.

Figure 1:
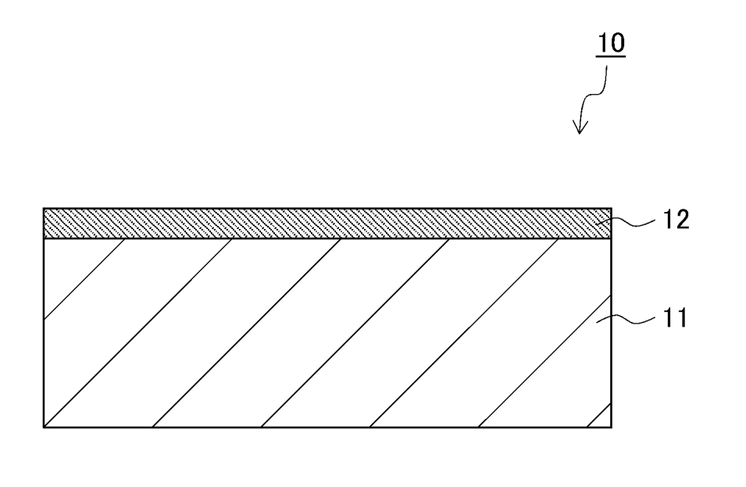
The Figure is a cross-sectional view showing a laminated metal plate with use of a resin film for laminating a metal plate in an embodiment of the present invention.

The resin film for laminating a metal plate of the present invention is used, for example, to form a laminating film 12 of a laminated metal plate 10 shown in Figure. The Figure is a cross-sectional view showing the laminated metal plate 10 according to the present embodiment, in which one surface of the metal plate 11 is coated with the laminating film 12. The laminated metal plate 10 shown in Figure 1 is used as a material for forming, for example, a can having no side seam (seamless can). A known method may be used for coating the metal plate 11 with the laminating film 12. For example, a lamination method including preheating the metal plate 11 and thermally bonding the laminating film 12, a coating method including melting the resin composition for forming the laminating film 12 and extruding the melted resin composition on the metal plate 11, are also applicable.

<Laminated Metal Plate>

Subsequently, the laminated metal plate of the present embodiment is described with reference to the laminated metal plate 10 shown in the Figure. The laminated metal plate 10 shown in the Figure is produced by laminating a laminating film 12 on one surface of a metal plate 11. In the present embodiment, the resin film for laminating a metal plate of the present invention described above is used as the laminating film 12.

The metal plate 11 is not particularly limited, and various surface-treated steel plates such as an electrolytically chromic acid-treated steel plate (tin-free steel, hereinafter appropriately referred to as "TFS") and a tin-plated steel plate (tinplate, hereinafter appropriately referred to as "tinplate") that are widely used as a material for ordinary cans, and an aluminum alloy plate may be used. As the surface-treated steel plate, a TFS having a two-layer film including a lower layer of metallic chromium with a film amount of 10 to 200 mg/m$^2$ and an upper layer of chromium hydrated oxide with a film amount of 1 to 30 mg/m$^2$ in terms of chromium famed on a steel plate is preferred. The TFS having such a structure has sufficient adhesion to the resin film for laminating a metal plate of the present embodiment, and also has corrosion resistance.

A preferred tinplate has a surface of steel plate plated with tin in a plating amount of 0.1 to 11.2 g/m$^2$, with two-layer film including metallic chromium and chromium hydrated oxidation in a film amount of 1 to 30 mg/m$^2$ in terms of chromium famed thereon; or with a single-layer film of chromium hydrate oxide only formed thereon. In any of the cases, it is preferable that the steel plate for use as a substrate be a low-carbon cold-rolled steel plate that is generally used as a material for cans. It is preferable that the thickness of the steel plate be 0.1 to 0.32 nm. As for the aluminum alloy plate, JIS 3000 series or JIS 5000 series is preferred. In particular, one having a surface subjected to electrolytic chromic acid treatment to form a two-layer film including a lower layer of metallic chromium in a film amount of 0 to 200 mg/m$^2$ and an upper layer of chromium hydrated oxide in a film amount of 1 to 30 mg/m$^2$ in terms of chromium, or one having a surface subjected to phosphoric acid chromate treatment to adhere a chromium component in an amount of 1 to 30 mg/m$^2$ in terms of chromium and a phosphorus component in an amount of 0 to 30 mg/m$^2$ in terms of phosphorus is preferred. It is preferable that the thickness of the aluminum alloy plate be 0.15 to 0.4 mm.

The laminated metal plate 10 of the present invention can be produced by, for example, the following method. That is, the laminated metal plate 10 can be produced by pressure bonding the resin film for laminating a metal plate of the present invention to a metal plate 11 heated to a temperature higher than the melting point of the thermoplastic polyester in the laminating film 12 by 20° C. to 40° C. with a pair of laminating rolls of a known laminator and then cooling the film. On this occasion, in order to improve the adhesion between the laminating film 12 and the metal plate 11, a primer layer may be provided between the laminating film 12 and the metal plate 11. Typical examples of the primer coating excellent in adhesion and corrosion resistance include a phenol epoxy coating material made of a resol-type phenolic aldehyde resin derived from various phenols and formaldehyde and a bisphenol-type epoxy resins. In particular, a coating material containing a resol-type phenol aldehyde resin and a bisphenol-type epoxy resin at a weight ratio of 50:50 to 5:95 is preferred, and a coating material containing those at a weight ratio of 40:60 to 10:90 is more preferred. It is preferable that the adhesive primer layer generally has a thickness of 0.01 to 10 μm. The adhesive primer layer may be provided on the metal plate 11 in advance.

Alternatively, the laminated metal plate 10 may be produced by a method including directly laminating the resin film for laminating a metal plate of the present invention extruded in a film state from a T-die after melt-kneading on the metal plate 11. According to the method, the laminated metal plate 10 is directly produced, so that cost reduction can be achieved.

Then thickness of the laminating film 12 on the laminated metal plate 10 is not particularly limited, preferably 8 to 35 μm, more preferably 15 to 30 μm.

<Container (Seamless Can)>

The laminated metal plate 10 of the present invention may be used in various containers. For example, a can having no side seam (seamless can) can be made therefrom. Specifically, the can having no side seam (seamless can) can be made by applying drawing, flexural elongation (stretching) and/or ironing to the laminated metal plate 10 such that the laminating film 12 is on the inner side. Incidentally, the container of the present embodiment is not particularly limited to the can having no side seam (seamless can), and can be suitably used as other cans, boxes and lids for accommodating beverages, foods and medicines.

EXAMPLES

The present invention is more specifically described with reference to Examples as follows, though the present invention is not limited thereto.

Evaluation methods for the respective properties are as follows.

<Type and Content of Soft Segment of Thermoplastic Elastomer>

The thermoplastic elastomer was dissolved in deuterated trifluoroacetic acid, further diluted with deuterated chloroform (containing 0.1 wt % of trimethylsilane), and subjected to measurement of proton NMR spectrum with a nuclear magnetic resonance analyzer (trade name "JNM-ECZ400S", manufactured by JEOL Ltd.) for evaluation of the type and content of the soft segment component.

<Glass Transition Temperature (Tg) of Thermoplastic Polyester and Resin Film for Laminating Metal Plate>

Melting was performed at 280° C. using a differential scanning calorimeter (trade name "DSC8500", manufactured by PerkinElmer), and cooling to −50° C. was performed at 200° C./min. Then, the extrapolation onset temperature of glass transition observed in temperature raising from −50° C. to 280° C. at 10° C./min was defined as the glass transition temperature (Tg).

<Glass Transition Temperature (Tg) of Polyester-Based Thermoplastic Elastomer>

The polyester-based thermoplastic elastomer was melted with a differential scanning calorimeter (trade name "DSC8500", manufactured by PerkinElmer) and then cooled to −50° C. at 200° C./min. Then, the extrapolation onset temperature of glass transition observed in temperature raising from −50° C. to 280° C. at 10° C./min was defined as the glass transition temperature (Tg). The melting temperature on this occasion was set at 200° C. for polyester-based thermoplastic elastomers (A1) and (A6), 230° C. for a polyester-based thermoplastic elastomer (A2), and 250° C. for polyester-based thermoplastic elastomers (A3), (A4) and (A5).

<Elastic Modulus of Polyolefin Component>

The storage elastic modulus (E') at 40° C. and 10 Hz obtained by an automatic instrument for measuring dynamic viscoelasticity (trade name "RHEOVIBRON DDV-01FP", manufactured by Orientec Co., Ltd.) was evaluated as elastic modulus.

<Major Axis and Minor Axis of Polyester-Based Thermoplastic Elastomer Dispersed in Film>

The cross section of the film was observed with a scanning electron microscope to measure the major axis and the minor axis of the polyester-based thermoplastic elastomer dispersed in a 10 μm square. The respective measured data were averaged to determine an average major axis and the average minor axis.

<Workability>

A laminated metal plate was prepared by pressure bonding the resin film for laminating a metal plate to a TFS (tin-free steel) having a thickness of 0.225 mm heated to 260° C. with a pair of laminating rolls of a laminator and then cooling the film. Subsequently, the laminated metal plate was subjected to ironing under the following conditions to be formed into a drawn and ironed can (DI can (food can No. 7)) having no side seam by a body maker.

Temperature of resin film for laminating metal plate immediately before drawing and ironing: normal temperature Blank diameter: 147.5 mm Drawing conditions: drawing ratio in first stage: 1.62, drawing ratio in second stage: 1.39

Punch diameter: 65.55 mm

Reduction: 50%

Then, the presence or absence of tiny peeling (film floating), scraping, and hair cracks of the resin film for laminating a metal plate in the vicinity of the open end after body molding was evaluated according to the following criteria.

Good: In 100 cans, no can had film floating, scraping, or hair cracks.

Fair: In 100 cans, 10 or less cans had film floating, scraping, or hair cracks.

Poor: In 100 cans, 11 or more cans had film floating, scraping, or hair cracks.

<Impact Resistance (Dent ERV)>

The can wall after retort treatment was subjected to a dent ERV evaluation under the following conditions.

Using a DuPont impact tester, a weight of 172 g was dropped from a height of 50 mm toward a punch having a tip diameter of 0.5 mm so as to make dents at a height of 40 mm from the bottom of the cup in three directions of 0°, 45°, and 90° with respect to the rolling direction of the plate, and the ERV (Enamel Rater Value) of the dented part was measured.

As the electrolytic solution, a solution obtained by mixing a 1% sodium chloride aqueous solution containing 200 mg/L of a surfactant (Rapisol A-80, manufactured by NOF) with ethanol at a ratio of 2:1 was used. A voltage of 6 V was applied to read the current value after 4 seconds as the measured value.

For the evaluation, an average value of the 3 points was calculated for each type of the samples for determination according to the following criteria.

Good: 0.05 mA or less

Fair: more than 0.05 mA and 0.1 mA or less

Poor: more than 0.1 mA

<Slidability of Film>

Using a surface property measuring machine (trade name "Surface property measuring machine TYPE: 14", manufactured by Shinto Scientific Co., Ltd., with an ASTM flat indenter (63 mm square (40 cm$^2$)), the coefficient of dynamic friction for the polyester film (without addition of lubricant) was evaluated at a load of 200 gf and a test velocity of 100 mm/min.

For the evaluation, an average value of 3 points was calculated for each type of the samples for determination according to the following criteria.

Good: 1.0 or less

Fair: less than 1.0

Example 1

From the hopper of a twin-screw extruder, 89.5 parts by weight of polyethylene terephthalate copolymerized with 2 mol % of isophthalic acid (thermoplastic polyester (P1) (trade name "BK6180B", manufactured by Mitsubishi Chemical Corporation)) having a limiting viscosity [η] of 0.8 (dl/g) (measured at 30° C., in a state dissolved in a mixed solvent of phenol/1,1,2,2-tetrachloroethane=1/1; the same applies hereinafter) and a glass transition temperature (Tg) of 76.9° C. was supplied and melted at 285° C. to 275° C. Further, from a feeding port provided in the middle of the twin-screw extruder, 5 parts by weight of a polyester-based thermoplastic elastomer (A1) (trade name "Modic GQ430", manufactured by Mitsubishi Chemical Corporation, glass transition temperature (Tg): −26° C.), 5 parts by weight of an ethylene-propylene copolymer resin (trade name "Adflex Q100F", manufactured by Lyondel Basell, elastic modulus: 98 MPa) as polyolefin (B1), and 0.5 parts by weight of vitamin E (trade name "Irganox E201", manufactured by BASF) as an antioxidant were supplied to be melt-kneaded with the thermoplastic polyester (P1) supplied from the hopper at 270° C. to 255° C. The melt-kneaded product was extruded into a film state with a T-die, and cooled and solidified with a cast roll, so that a resin film for laminating a metal plate having a thickness of 20 μm was produced. The glass transition temperature (Tg) of the film was 76.4° C., and the absolute value ΔTg of the difference in Tg from the raw material thermoplastic polyester (thermoplastic polyester (P1)) was 0.5° C. The type and content of the soft segment of the polyester-based thermoplastic elastomer (A1), the elastic modulus of the polyolefin (B1), and evaluation results of the experimentally produced resin films for laminating a metal plate excluding glass transition temperature (Tg) are shown in Table 1. As shown in Table 1, all of the workability, impact resistance, and slidability of the film were good. Incidentally, as shown in Table 1, a polybutylene terephthalate-based elastomer copolymerized with 56 wt % of polytetramethylene ether glycol (PTMG, molecular weight: 1000) unit as a soft segment was used as the polyester-based thermoplastic elastomer (A1).

Examples 2 and 3

A resin film for laminating a metal plate was produced in the same manner as in Example 1, except that the amounts of the thermoplastic polyester (P1) and the polyester-based thermoplastic elastomer (A1) were changed such that in Example 2, the amount of the thermoplastic polyester (P1) used was 84.5 parts by weight and the amount of the polyester-based thermoplastic elastomer (A1) used was 10 parts by weight, and in Example 3, the amount of the thermoplastic polyester (P1) used was 79.5 parts by weight, and the amount of the polyester-based thermoplastic elastomer (A1) used was 15 parts by weight. The glass transition temperatures (Tg) of these films were 75.9° C. and 75.4°, respectively, and the Tg (ΔTg) with respect to the thermoplastic polyester was as shown in Table 1. As shown in Table 1, all of the workability, impact resistance, and slidability of the film were good.

Example 4

A resin film for laminating a metal plate was produced in the same manner as in Example 1, except that a polyolefin (B2) was used instead of the polyolefin (B1). As the polyolefin (B2), metallocene plastomer (trade name "Kernel KF380", manufactured by Japan Polyethylene Corporation) having an elastic modulus of 102 MPa was used. As shown in Table 1, all of the workability, impact resistance, and slidability of the film were good.

Examples 5 and 6

A resin film for laminating a metal plate was produced in the same manner as in Example 1, except that a polyester-based elastomer (A2) was used instead of the polyester-based thermoplastic elastomer (A1) to make the resin composition shown in Table 1. A polybutylene terephthalate-based elastomer (trade name "Hytrel 5557", manufactured by DuPont, glass transition temperature (Tg): −1° C.)) copolymerized with 34 wt % of polytetramethylene ether glycol (PTMG, molecular weight: 5000) unit as a soft segment was used as the polyester-based thermoplastic elastomer (A2). Although Tg of the film was slightly low and the workability was slightly lowered, the impact resistance and slidability of the film were good as shown in Table 1.

Example 7

A resin film for laminating a metal plate was produced in the same manner as in Example 2, except that no polyolefin was used and the amount of the thermoplastic polyester (P1) used was 89.5 parts by weight. Although the slidability of the film was slightly lowered, both of the workability and impact resistance were good as shown in Table 1.

Example 8

A resin film for laminating a metal plate was produced in the same manner as in Example 1, except that a polyolefin (B3) was used instead of the polyolefin (B1). As the polyolefin (B3), a block polypropylene (trade name "Novatec PP BC6DRF", manufactured by Japan Polypropylene Corporation) having a high elastic modulus of 580 MPa was used. Although the workability of the film and the slidability of the film were good as shown in Table 1, the impact resistance was slightly lowered.

Comparative Example 1

A resin film for laminating a metal plate was produced in the same manner as in Example 1, except that no polyester-based thermoplastic elastomer was added and the amount of the thermoplastic polyester (P1) used was 94.5 parts by weight. The film had a low impact resistance as shown in Table 2.

Comparative Example 2

A resin film for laminating a metal plate was produced in the same manner as in Example 1, except that the amount of the polyester-based thermoplastic elastomer (A1) used was 55 parts by weight and the amount of the thermoplastic polyester (P1) used was 40.5 parts by weight. However, the resin was unable to be extruded from the T-die into a film state, so that no film was famed.

Comparative Examples 3 to 8

A resin film for laminating a metal plate was produced in the same manner as in Example 1, except that one of the polyester-based thermoplastic elastomers (A3) to (A5) shown in Table 2 was added instead of the polyester-based thermoplastic elastomer (A1) and the resin composition was as shown in Table 2. As the thermoplastic elastomer (A3), a polybutylene terephthalate-based elastomer (trade name "Hytrel 7427", manufactured by DuPont, glass transition temperature (Tg): 5° C.)) copolymerized with 16 wt % of polytetramethylene ether glycol (PTMG, molecular weight: 5000) unit as a soft segment was used. As the thermoplastic elastomer (A4), a polybutylene terephthalate-based elastomer (trade name "Novaduran 5510S", manufactured by Mitsubishi Engineering-Plastics Corporation, glass transition temperature (Tg): 2° C.)) copolymerized with 19 wt % of polytetramethylene ether glycol (PTMG, molecular weight: 500) unit as a soft segment was used. As the thermoplastic elastomer (A5), a polybutylene terephthalate-based elastomer (trade name "Novaduran 5505S", manufactured by Mitsubishi Engineering-Plastics Corporation, glass transition temperature (Tg): 5° C.)) copolymerized with 10 wt % of polytetramethylene ether glycol (PTMG, molecular weight: 500) unit as a soft segment was used. These films had a lower Tg in comparison with the thermoplastic polyester (P1) and poor workability. Further, the polyester-based thermoplastic elastomer dispersed in the film was unclear (insufficient formation of island structure) and the impact resistance was low.

Comparative Examples 9 and 10

A resin film for laminating a metal plate was produced in the same manner as in Example 1, except that a polyester-based thermoplastic elastomer (A6) (trade name "Ecoflex F Blend C1200", manufactured by BASF, glass transition temperature (Tg): −24° C.) was added instead of the polyester-based thermoplastic elastomer (A1), and the resin composition was as shown in Table 2. The polyester-based thermoplastic elastomer (A6) was PBT copolymerized with 50 mol % of adipic acid. These films had a low Tg in comparison with the thermoplastic polyester (P1) used and poor workability.

Comparative Example 11

A resin film for laminating a metal plate was produced in the same manner as in Example 1, except that a polyethylene naphthalate having a glass transition temperature (Tg) of 119° C. (thermoplastic polyester (P2), trade name "TN8065S", manufactured by Teijin Limited) was used instead of the thermoplastic polyester (P1). The film had low workability and low impact resistance as shown in Table 3.

Comparative Example 12

A resin film for laminating a metal plate was produced in the same manner as in Example 1, except that a polyethylene terephthalate copolymerized with 12 mol % of isophthalic acid and 6 mol % of dimer acid (thermoplastic polyester (P3)), having a limiting viscosity [η] of 1.0 (dl/g) (measured at 30° C., in a state dissolved in a mixed solvent of phenol/1,1,2,2-tetrachloroethane=1/1; the same applies hereinafter), and a glass transition temperature (Tg) of 50° C., was used instead of the thermoplastic polyester (P1). The film had low workability as shown in Table 3.

Example 9

From the hopper of a twin-screw extruder A, 89.5 parts by weight of polyethylene terephthalate copolymerized with 2 mol % of isophthalic acid (thermoplastic polyester (P1)) having a limiting viscosity [η] of 0.8 (dl/g) (measured at 30° C., in a state dissolved in a mixed solvent of phenol/1,1,2,2-tetrachloroethane=1/1; the same applies hereinafter), and a glass transition temperature (Tg) of 76.9° C. was supplied and melted at 285° C. to 275° C. Further, from a feeding port provided in the middle of the twin-screw extruder A, 5 parts by weight of a polyester-based thermoplastic elastomer (A1), 5 parts by weight of a polyolefin (B1), and 0.5 parts by weight of vitamin E (trade name "Irganox E201", manufactured by BASF) as an antioxidant were supplied to be melt-kneaded with the thermoplastic polyester (P1) supplied from the hopper at 270° C. to 255° C. Further, the thermoplastic polyester (P1) was supplied to a twin-screw extruder B, and melt-kneaded at 285° C. to 260° C. The resins extruded from these twin-screw extruders A and B were supplied to a multi-manifold T-die, extruded into a film state, and cooled and solidified with a cast roll, so that a 2-layer resin film for laminating a metal plate having thickness of 20 µm, composed of the resin supplied to the twin-screw extruder A as a lower layer and the resin supplied to the twin-screw extruder B as a surface layer, was produced. The thickness ratio between the resin layer composed of the thermoplastic polyester blended with a polyester-based elastomer and polyolefin and the thermoplastic polyester layer (lower layer:surface layer) was 4:1. A laminated metal plate was prepared such that the resin layer (lower layer) composed of the thermoplastic polyester blended with polyester-based elastomer and polyolefin adheres to TFS (tin-free steel) for evaluation of the workability and impact resistance. As shown in Table 4, both of the evaluation results were good.

Example 10

A resin film for laminating a metal plate was produced in the same manner as in Example 9, except that instead of the thermoplastic polyester (P1), a polyethylene naphthalate having a glass transition temperature (Tg) of 119° C. (thermoplastic polyester (P2), trade name "TN8065S", manufactured by Teijin Limited) was supplied to the twin-screw extruder B to make a surface layer. As shown in Table 4, all of the workability, impact resistance, and slidability of the film were good.

TABLE 1

| Item | Type of resin | Trade name | Resin composition (physical property of resin) | Example 1 | 2 | 3 | 4 | 5 | 6 | 7 | 8 |
|---|---|---|---|---|---|---|---|---|---|---|---|
| Resin composition (part by weight) | Thermoplastic polyester (P1) | BK6180B | PET copolymerized with 2 mol % of isophthalic acid | 89.5 | 84.5 | 79.5 | 89.5 | 84.5 | 74.5 | 89.5 | 89.5 |
| | Polyester-based thermoplastic elastomer (A1) | Modic GQ430 | PBT copolymerized with 56 wt % of PTMG (molecular weight: 1000) | 5 | 10 | 15 | 5 | 0 | 0 | 10 | 5 |
| | Polyester-based thermoplastic elastomer (A2) | Hytrel 5557 | PET copolymerized with 34 wt % of PTMG (molecular weight: 5000) | 0 | 0 | 0 | 0 | 10 | 20 | 0 | 0 |
| | Polyolefin (B1) | ADFLEX Q100F | PP-PE elastomer (elastic modulus 98 MPa) | 5 | 5 | 5 | 0 | 5 | 5 | 0 | 0 |
| | Polyolefin (B2) | Kernel KF380 | Metallocene plastomer (elastic modulus: 102 MPa) | 0 | 0 | 0 | 5 | 0 | 0 | 0 | 0 |
| | Polyolefin (B3) | Novatec PP BC6DRF | Block PP (elastic modulus: 580 MPa) | 0 | 0 | 0 | 0 | 0 | 0 | 0 | 5 |
| | Antioxidant | Irganox E201 | — | 0.5 | 0.5 | 0.5 | 0.5 | 0.5 | 0.5 | 0.5 | 0.5 |

TABLE 1-continued

| Item | Type of resin | Trade name | Resin composition (physical property of resin) | Example 1 | 2 | 3 | 4 | 5 | 6 | 7 | 8 |
|---|---|---|---|---|---|---|---|---|---|---|---|
| | | Tg of film (° C.) | | 76.4 | 75.9 | 75.4 | 76.3 | 73.8 | 69.1 | 75.9 | 76.4 |
| | | ΔTg (° C.) | | 0.5 | 1 | 1.5 | 0.6 | 3.1 | 7.8 | 1 | 0.5 |
| | | ΔTg/(proportion of polyester-based thermoplastic elastomer (wt %)) | | 0.1 | 0.1 | 0.1 | 0.1 | 0.3 | 0.4 | 0.1 | 0.1 |
| Size of polyester-based thermoplastic elastomer dispersed in film | | Average major axis (μm) | | 1 | 1.2 | 2 | 0.9 | 3 | 4 | 1.1 | 1 |
| | | Average minor axis (μm) | | 0.2 | 0.2 | 0.5 | 0.2 | 0.5 | 0.7 | 0.2 | 0.1 |
| | | Workability | | Good | Good | Good | Good | Fair | Fair | Good | Good |
| | | Impact resistance | | Good | Good | Good | Good | Good | Good | Good | Fair |
| | | Slidability of film | | Good | Good | Good | Good | Good | Good | Fair | Good |

TABLE 2

| Item | Type of resin | Trade name | Resin composition (physical property of resin) | Example 1 | 2 | 3 | 4 | 5 | 6 | 7 | 8 | 9 | 10 |
|---|---|---|---|---|---|---|---|---|---|---|---|---|---|
| Resin composition (part by weight) | Thermoplastic polyester (P1) | BK6180B | PET co-polymerized with 2 mol % of isophthalic acid | 94.5 | 40.5 | 84.5 | 74.5 | 84.5 | 74.5 | 84.5 | 74.5 | 84.5 | 74.5 |
| | Polyester-based thermoplastic elastomer (A1) | Modic GQ430 | PBT co-polymerized with 56 wt % of PTMG (molecular weight: 1000) | 0 | 55 | 0 | 0 | 0 | 0 | 0 | 0 | 0 | 0 |
| | Polyester-based thermoplastic elastomer (A3) | Hytrel 7247 | PBT co-polymerized with 16 wt % of PTMG (molecular weight: 5000) | 0 | 0 | 10 | 20 | 0 | 0 | 0 | 0 | 0 | 0 |
| | Polyester-based thermoplastic elastomer (A4) | Novaduran 5510S | PBT co-polymerized with 19 wt % of PTMG (molecular weight: 500) | 0 | 0 | 0 | 0 | 10 | 20 | 0 | 0 | 0 | 0 |
| | Polyester-based thermoplastic elastomer (A5) | Novaduran 5505S | PBT co-polymerized with 10 wt % of PTMG (molecular weight: 500) | 0 | 0 | 0 | 0 | 0 | 0 | 10 | 20 | 0 | 0 |
| | Polyester-based thermoplastic elastomer (A6) | Ecoflex F Blend C1200 | PBT co-polymerized with 50 mol % of adipic acid | 0 | 0 | 0 | 0 | 0 | 0 | 0 | 0 | 10 | 20 |
| | Polyolefin (B1) | ADFLEX Q100F | PP-PE elastomer (elastic modulus: 98 MPa) | 5 | 5 | 5 | 5 | 5 | 5 | 5 | 5 | 5 | 5 |
| | Antioxidant | Irganox E201 | — | 0.5 | 0.5 | 0.5 | 0.5 | 0.5 | 0.5 | 0.5 | 0.5 | 0.5 | 0.5 |
| | | Tg of film (° C.) | | 76.8 | Unable to be formed into film | 72.4 | 67.8 | 72.3 | 66.4 | 69.8 | 56.2 | 64.7 | 53.7 |
| | | ΔTg (° C.) | | 0.1 | | 4.5 | 9.12 | 4.6 | 10.5 | 7.1 | 20.7 | 12.2 | 23.3 |
| | | ΔTg/(proportion of polyester-based thermoplastic elastomer (wt %)) | | 0 | | 0.5 | 0.5 | 0.5 | 0.5 | 0.7 | 1.0 | 1.2 | 1.2 |
| Size of polyester-based thermoplastic elastomer dispersed in film | | Average major axis (μm) | | — | | 7 (Unclear) | 8 (Unclear) | — (Unclear) | — (Unclear) | — (Unclear) | — (Unclear) | 3 | 6 |
| | | Average minor axis (μm) | | — | | 0.5 (Unclear) | 0.5 (Unclear) | — (Unclear) | — (Unclear) | — (Unclear) | — (Unclear) | 0.3 | 0.5 |
| | | Workability | | Good | | Poor | Poor | Poor | Poor | Poor | Poor | Poor | Poor |
| | | Impact resistance | | Poor | | Fair | Fair | Poor | Poor | Poor | Poor | Fair | Fair |
| | | Slidability of film | | Good | | Good | Good | Good | Good | Good | Good | Good | Good |

TABLE 3

| Item | Type of resin | Trade name | Resin composition (physical property of resin) | Comparative Example 11 | Comparative Example 12 |
|---|---|---|---|---|---|
| Resin composition (part by weight) | Thermoplastic polyester (P2) | TN8065S | Polyethylene naphthalate | 89.5 | 0 |
| | Thermoplastic polyester (P3) | — | PET copolymerized with 12 mol% of isophthalic acid and 6 mol% of dimer acid | 0 | 89.5 |
| | Polyester-based thermoplastic elastomer (A1) | Modic GQ430 | PBT copolymerized with 56 wt% of PTMG (molecular weight 1000) | 5 | 5 |
| | Polyolefin (B1) | ADFLEX Q100F | PP-PE elastomer (elastic modulus: 98 MPa) | 5 | 5 |
| | Polyolefin (B3) | Novatec PP BC6DRF | Block PP (elastic modulus: 580 MPa) | 0 | 0 |
| | Antioxidant | Irganox E201 | — | 0.5 | 0.5 |
| Tg of film (° C.) | | | | 117.5 | 49.5 |
| ΔTg (° C.) | | | | 0.5 | 0.5 |
| ΔTg/(proportion of polyester-based thermoplastic elastomer (wt%)) | | | | 0.1 | 0.1 |
| Size of polyester-based thermoplastic elastomer dispersed in film | | | Average major axis (μm) | 1 | 1.5 |
| | | | Average minor axis (μm) | 0.3 | 0.3 |
| Workability | | | | Poor | Poor |
| Impact resistance | | | | Poor | Good |
| Slidability of film | | | | Good | Good |

TABLE 4

| Item | | Type of resin | Trade name | Resin composition (physical property of resin) | Example 9 | Example 10 |
|---|---|---|---|---|---|---|
| Surface layer | Resin composition (part by weight) | Thermoplastic polyester (P1) | BK6180B | PET copolymerized with 2 mol % of isophthalic acid (Tg = 76.9° C.) | 100 | 0 |
| | | Thermoplastic polyester (P2) | TN8065S | Polyethylene naphthalate (Tg = 118° C.) | 0 | 100 |
| Lower layer | | Thermoplastic polyester (P1) | BK6180B | PET copolymerized with 2 mol % of isophthalic acid | 89.5 | 89.5 |
| | | Polyester-based thermoplastic elastomer (A1) | Modic GQ430 | PBT copolymerized with 56 wt % of PTMG (molecular weight: 1000) | 5 | 5 |
| | | Polyolefin (B1) | ADFLEX Q100F | PP-PE elastomer (elastic modulus: 98 MPa) | 5 | 5 |
| | | Antioxidant | Irganox E201 | — | 0.5 | 0.5 |
| Tg of film (° C.) | | | | | 76.4 | 76.4 |
| ΔTg (° C.) | | | | | 0.5 | 0.5 |
| ΔTg/(ratio of polyester-based elastomer (wt %)) | | | | | 0.1 | 0.1 |
| Size of polyester-based thermoplastic elastomer dispersed in film | | | | Average major axis (μm) | 1 | 1 |
| | | | | Average minor axis (μm) | 0.2 | 0.2 |
| Thickness ratio (lower layer/surface layer) | | | | | 4/1 | |
| Workability | | | | | Good | Good |
| Impact resistance | | | | | Good | Good |
| Slidability of film | | | | | Good | Good |

REFERENCE SIGNS LIST

10: LAMINATED METAL PLATE
12: LAMINATING FILM
11: METAL PLATE

The invention claimed is:

1. A resin film for laminating a metal plate comprising a resin composition including a polyester-based thermoplastic elastomer and a thermoplastic polyester having a glass transition temperature (Tg) of 72 to 85° C. where the thermoplastic elastomer is dispersed in the thermoplastic polyester, wherein
a content of the thermoplastic elastomer in the film is 2.5 to 25 wt %,
a content of the thermoplastic polyester in the film is 74.5 wt % to 97.5 wt %,
the thermoplastic polyester is a polyethylene terephthalate copolymerized with isophthalic acid,
the polyester-based thermoplastic elastomer is a resin obtained by copolymerizing polybutylene terephthalate with 34 to 56 wt % of polytetramethylene glycol, and
an absolute value ΔTg of a difference between a glass transition temperature of the thermoplastic polyester and a glass transition temperature of the film satisfies the following Expression (1):

$$\Delta Tg < 0.5 \times W \quad (1)$$

wherein W represents a thermoplastic elastomer content (wt %) in the film.

2. The resin film for laminating a metal plate according to claim 1, wherein the ΔTg satisfies the following Expression (2):

$$\Delta Tg < 0.2 \times W \quad (2)$$

3. The resin film for laminating a metal plate according to claim 1, wherein the thermoplastic elastomer is a polyether ester and contains 50 wt % or more of the polyether unit.

4. The resin film for laminating a metal plate according to claim 1,
wherein the polyester-based thermoplastic elastomer is dispersed in an island state in the resin film for laminating a metal plate, and
the thermoplastic elastomer dispersed in an island state has an average major axis of 0.1 to 5.0 μm and an average minor axis of 0.01 to 2 μm.

5. The resin film for laminating a metal plate according to claim 1, wherein the resin film contains 1 to 10 wt % of a polyolefin having an elastic modulus of 300 MPa or less.

6. A laminated film comprising a resin layer laminated on the resin film for laminating a metal plate according to claim 1.

7. A laminated metal plate comprising a metal surface coated with the laminated film according to claim 6.

8. A container or a lid comprising the laminated metal plate according to claim 7, wherein the resin film for laminating a metal plate or the laminated film is processed to be on the inner surface side.

9. A laminated metal plate comprising a metal surface coated with the resin film for laminating a metal plate according to claim 1.

10. A container or a lid comprising the laminated metal plate according to claim 9, wherein the resin film for laminating a metal plate or the laminated film is processed to be on the inner surface side.

* * * * *